No. 686,726. Patented Nov. 19, 1901.
E. M. GRIFFITHS & A. E. LANGLEY.
BACKING-OFF MECHANISM FOR LATHES.
(Application filed Jan. 19, 1901.)
(No Model.)

WITNESSES:
Frank S. Ober
Waldo M. Chapin

INVENTORS
Edward M. Griffiths
Arthur E. Langley
BY
Rosenbaum
ATTORNEY

UNITED STATES PATENT OFFICE.

EDWARD MEREDITH GRIFFITHS AND ARTHUR EDWARD LANGLEY, OF LONDON, ENGLAND.

BACKING-OFF MECHANISM FOR LATHES.

SPECIFICATION forming part of Letters Patent No. 686,726, dated November 19, 1901.

Application filed January 19, 1901. Serial No. 43,951. (No model.)

*To all whom it may concern:*

Be it known that we, EDWARD MEREDITH GRIFFITHS and ARTHUR EDWARD LANGLEY, subjects of the Queen of Great Britain and Ireland, residing at Ludgate Square, London, England, have invented certain new and useful Improvements in Backing-Off Mechanism for Lathes, of which the following is a full, clear, and exact description.

This invention is a machine tool or attachment for "backing off" the teeth of rotary cutting-tools, and has for its object a simple appliance embodying a cutting-tool and automatic means for reciprocating it toward and away from the periphery of a toothed cutter undergoing manufacture in order that the periphery of each tooth of the cutter may be inclined or "backed off" from its cutting edge.

The improved appliance may be used as an attachment for a lathe or other machine having a rotary shaft or in connection with any rotary shaft suitable for the purpose.

In general terms the invention consists of a carriage adapted to reciprocate and carry a cutting or backing-off tool in combination with a rotary shaft upon which the work is mounted, provided with means for reciprocating the carriage at a rate conforming to the requirements of the work represented by the rotary cutter undergoing manufacture.

The invention further consists of certain constructions and combinations to be hereinafter described, and particularly pointed out in the claims.

Figure 1:
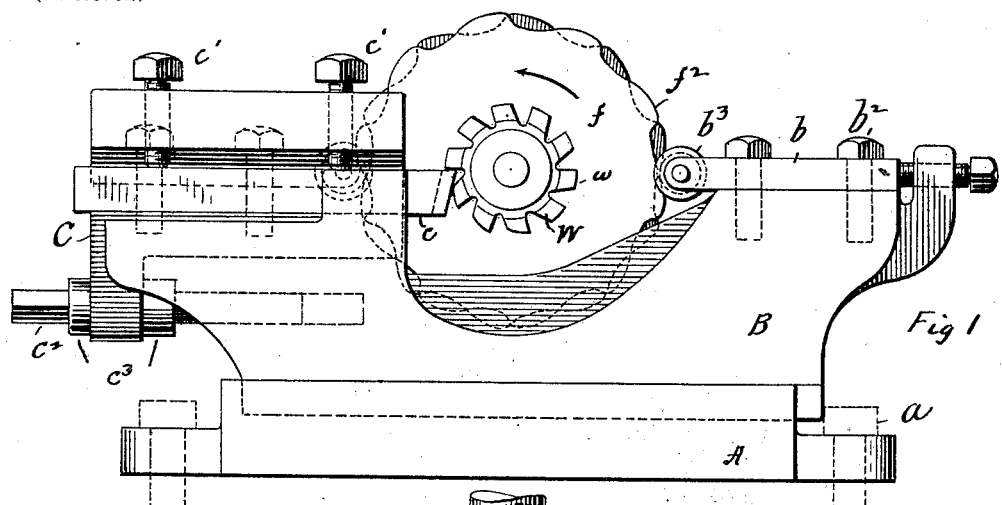
Figure 2:
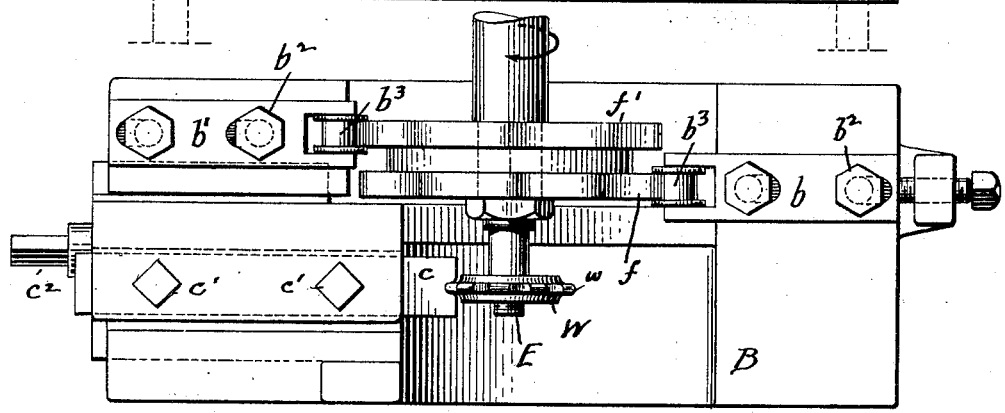
Figure 3:
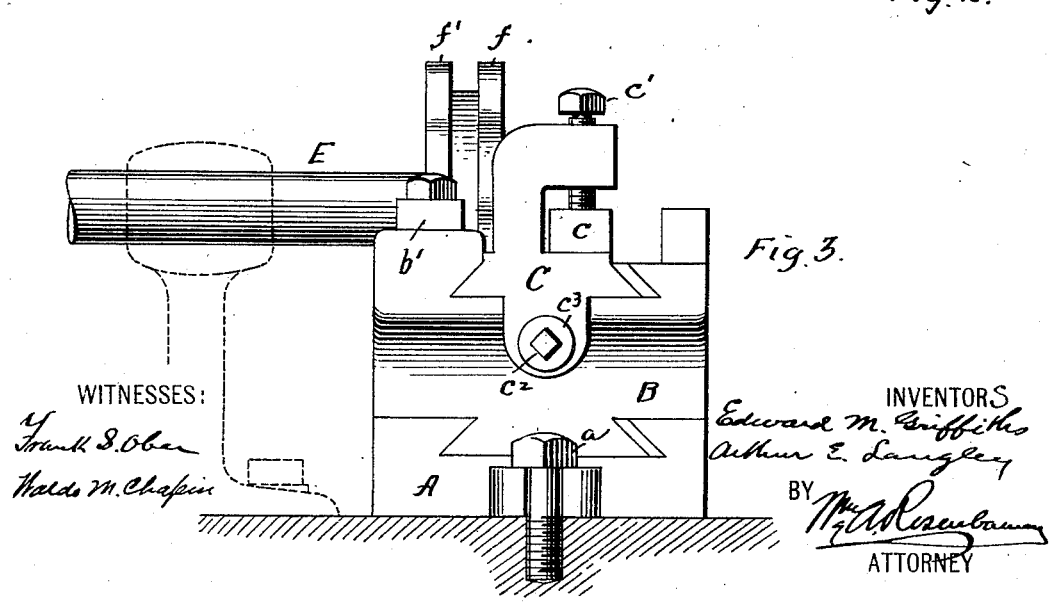

In the accompanying drawings, Figure 1 is a side view of the improved appliance, the shaft upon which the work is carried appearing in end elevation. Fig. 2 is a plan of the appliance; and Fig. 3 is an end elevation thereof, showing the shaft carrying the work in side elevation.

A represents the base or bed plate, adapted to be bolted to a lathe or other support by means of bolts $a$. (Shown in dotted lines in Fig. 1.) In the face of this bed-plate is a dovetailed guideway, in which is fitted to slide a carriage B. At one end of this carriage and in the upper part thereof is another but smaller carriage C, adapted to slide in the first-mentioned carriage. The carriage B contains a depression or opening in the middle, in which the work represented by the cutting-wheel W is located when the machine is in use. The carriage C is to receive the cutting-tool $c$, having its cutting end directed toward the work at the center. This tool is clamped in the carriage C by means of the bolts $c'$, and the carriage C is adjustable in the carriage B by means of the screw-shaft $c^2$, which enters a threaded hole in the carriage B. (Shown in dotted lines in Fig. 1.) This adjustment is for the purpose of fixing the relative position of the tool with respect to the demands of the work and when once set can be fixed by means of the lock-nuts $c^3$. In the upper surface of the slide B and at each end are attached blocks or brackets $b'$ by means of bolts $b^2$, which pass through slots in the brackets to permit of a certain amount of adjustment toward and away from the center of the machine. These brackets stand in parallel vertical planes and at the inner end of each, and mounted in bearings formed by a fork is a roller $b^3$.

The appliance so far described is adapted to be set crosswise upon the bed of a lathe or in the same relative position with respect to any suitable rotatable shaft. E represents such a shaft, which, as thus understood, may be the spindle of a lathe or any other shaft. Merely the end of this shaft is shown, and it is located in the depression of the slide B and is mounted in any suitable bearings, one of which is indicated in dotted lines in Fig. 3. On the end of this shaft and in the plane of the cutting-tool $c$ the work is mounted. This work consists of a rotary cutting-tool W, having teeth $w$, the backs or pripheral portions of which have to be inclined from one corner to the other. The operation of forming this incline on the teeth is called "backing off," and, as previously indicated, the function of this invention is to do this work automatically, rapidly, and cheaply.

On the same shaft with the work are mounted two disks $f$ and $f'$, one being in the same plane with the bracket $b$ and the other in the plane with the bracket $b'$. The peripheries of these disks are fluted to form a series of graduated cams $f^2$, equal in number to the number of teeth on the work W, and the projecting portions of the cams on one disk are opposite the spaces or depressions of the cams on the other disk. The rollers $b^3$ in the brackets $b$ and $b'$ bear, respectively, against the peripheries of these disks and diametrically opposite each other, so that when a projecting portion of a cam is presented to one of the rollers the depressed portion of a cam is presented to the other roller. Hence when the shaft E rotates, the slide B, on which the rollers $b^3$ are carried, will be moved first in one direction and then the other a distance corresponding to the radial length of the cams. The work W is placed upon the lathe so that its teeth will correspond in position with the cams.

When the appliance is in operation, the cutting-tool is first brought into contact with the periphery of a tooth on the work, near one corner thereof, and is gradually forced toward the center of the work while the latter is rotated. This results in cutting deeper and deeper into the periphery of the tooth, so that more of the metal is removed from the rearward portions of the tooth than from the forward portions, which is the desired object. When the tool $c$ has traversed a tooth, the cams on the disks $f\ f'$ reverse the direction of travel of the slide B and retract the tool $c$, so that it may begin cutting at the outermost position of the next succeeding tooth on the work, this operation being obviously repeated for each tooth of the work.

It will be observed that the shape of the cams is not entirely symmetrical, one side being steeper than the other for the purpose of making the withdrawal of the tool more rapid than its forward motion. It will be understood that a single cam-disk having a groove in its face and a single roller located in said groove and carried by the slide B might be used to obtain both motions of the slide instead of the arrangement of double disks and rollers shown; but these constructions are considered equivalent, although the construction shown and described is preferred for various mechanical reasons. The web shown at $s$ in the slide B is merely for strengthening purposes, and the adjusting-screw $p$ is for setting up the bracket $b$.

Having described our invention, we claim—

The combination in a backing-off attachment of a shaft adapted to carry the work, cams carried by said shaft adapted to act upon a reciprocating slide, adjustable attachments mounted on said slide to bear against said cams, a cutting-tool carried by said slide, and a second slide by means of which said cutting-tool is adjusted.

In witness whereof we subscribe our signatures in presence of two witnesses.

EDWARD MEREDITH GRIFFITHS.
ARTHUR EDWARD LANGLEY.

Witnesses:
G. CROYDON MARKS,
ALBERT E. PARKER.